(12) United States Patent
Patil

(10) Patent No.: US 12,502,106 B2
(45) Date of Patent: Dec. 23, 2025

(54) DEVICE FOR MONITORING OXYGEN SATURATION LEVELS IN CLINICAL CONDITIONS

(71) Applicant: KONINKLIJKE PHILIPS N.V., Eindhoven (NL)

(72) Inventor: Meru Adagouda Patil, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 957 days.

(21) Appl. No.: 17/436,804

(22) PCT Filed: Mar. 4, 2020

(86) PCT No.: PCT/EP2020/055706
§ 371 (c)(1),
(2) Date: Sep. 7, 2021

(87) PCT Pub. No.: WO2020/178346
PCT Pub. Date: Sep. 10, 2020

(65) Prior Publication Data
US 2022/0167888 A1    Jun. 2, 2022

Related U.S. Application Data

(60) Provisional application No. 62/814,890, filed on Mar. 7, 2019.

(51) Int. Cl.
*A61B 5/1455* (2006.01)
*A61B 5/00* (2006.01)

(52) U.S. Cl.
CPC ........ *A61B 5/14551* (2013.01); *A61B 5/6838* (2013.01); *A61B 5/7207* (2013.01);
(Continued)

(58) Field of Classification Search
CPC . A61B 5/14551; A61B 5/6838; A61B 5/7207; A61B 5/7264; A61B 2562/0219;
(Continued)

(56) References Cited

U.S. PATENT DOCUMENTS 5,368,224 A    11/1994   Richardson
5,846,190 A  * 12/1998   Woehrle ............... A61B 5/6843
                                                            600/336

(Continued)

FOREIGN PATENT DOCUMENTS

CN    103705249 A    4/2014
CN    104887246 A    9/2015
WO    2007024777 A2  3/2007

OTHER PUBLICATIONS

Masimo Corp."Assessing the Accuracy of Pulse Oximetry in True Clinical Settings" (https://www.masimo.co.uk/siteassets/uk/documents/pdf/clinical-evidence/whitepapers/lab4709a_whitepapers_pulse_oximetry_accuracy.pdf) 2007.

(Continued)

*Primary Examiner* — Jason M Sims
*Assistant Examiner* — Kyle W. Kretzer

(57) ABSTRACT

An oxygen saturation monitor (10) includes a clamp (12) having opposing first (14) and second (16) clamp portions. An array of light sources (18) is disposed on the first clamp portion. Each light source is switchable between (i) off, (ii) emitting light of a first wavelength or spectral range, (iii) emitting light of a second wavelength or spectral range different from the first wavelength or spectral range; and (iv) emitting light at both the first and second wavelengths or spectral ranges. An array of light detectors (20) is disposed on the second clamp portion facing the array of light sources. Each light detector of the array of light detectors is (Continued)

aligned to detect emitted light from a corresponding light source of the array of light sources.

5 Claims, 4 Drawing Sheets

(52) U.S. Cl.
CPC .... *A61B 5/7264* (2013.01); *A61B 2562/0219* (2013.01); *A61B 2562/046* (2013.01)

(58) Field of Classification Search
CPC ...... A61B 2562/046; A61B 2560/0247; A61B 5/7203
See application file for complete search history.

(56) References Cited

U.S. PATENT DOCUMENTS

| | | | |
|---|---|---|---|
| 6,181,959 | B1 | 1/2001 | Schoellermann |
| 9,480,407 | B2* | 11/2016 | Kumar ................. A61B 5/0059 |
| 10,441,219 | B2 | 10/2019 | Peeters |
| 2006/0211924 | A1* | 9/2006 | Dalke .................... A61B 5/746 600/326 |
| 2008/0097173 | A1* | 4/2008 | Soyemi .............. A61B 5/14551 600/310 |
| 2009/0326347 | A1 | 12/2009 | Scharf |
| 2010/0004519 | A1* | 1/2010 | Lamego ............. A61B 5/14546 250/216 |
| 2012/0179011 | A1* | 7/2012 | Moon ...................... A61B 5/28 600/324 |
| 2013/0172691 | A1 | 7/2013 | Tran |
| 2013/0324856 | A1* | 12/2013 | Lisogurski ............. A61B 5/021 600/476 |
| 2014/0088385 | A1 | 3/2014 | Moon |
| 2014/0235977 | A1 | 8/2014 | Banet |
| 2015/0305682 | A1 | 10/2015 | Leboeuf |
| 2016/0081603 | A1 | 3/2016 | Liu |
| 2017/0111722 | A1 | 4/2017 | Forstner |

OTHER PUBLICATIONS

International Search Report Jul. 22, 2020.

* cited by examiner

DEVICE FOR MONITORING OXYGEN SATURATION LEVELS IN CLINICAL CONDITIONS

CROSS-REFERENCE TO PRIOR APPLICATIONS

This application is the U.S. National Phase application under 35 U.S.C. § 371 of International Application No. PCT/EP2020/055706, filed on Mar. 4, 2020, which claims the benefit of U.S. Provisional Patent Application No. 62/814,890, filed on Mar. 7, 2019. These applications are hereby incorporated by reference herein.

FIELD

The following relates generally to patient monitoring arts, oxygen saturation monitoring arts, pulse oximetry arts, motion-compensation arts, and related arts.

BACKGROUND

Pulse oximeters are a common device used in clinical settings. Pulse oximeters are used for monitoring a blood-oxygen saturation ($SpO_2$) level of patients. Typically, in clinical environment settings, a pulse oximeter can be attached (i.e., hooked on) to a patent, and the pulse oximeter continuously measures the $SpO_2$ level. Since the pulse oximeter needs to be continuously attached to the patient, the pulse oximeter is designed so that it is not attached too tightly to the patient's body part. This device is typically hooked on to one of the index fingers (or any other finger) in adult patients. For pediatric uses, the device is designed to be hooked to leg of the patient. The pulse oximeter should be loose enough so that it does not hurt or cause discomfort to the patient due to long duration of usage. However, this kind of design makes the device vulnerable to movements when patient body moves.

The pulse oximeter is configured to determine $SpO_2$ level based on a measured difference in the absorption of red and infrared light by hemoglobin (Hb) and oxygenated hemoglobin ($HbO_2$), and also based on volume of arterial blood in the measuring area of the tissue. Any change or disturbance to the measured difference in the absorption, or in the measured volume, affect the final $SpO_2$ reading from the pulse oximeter. For example, motion by a patient may induce a change in the location of measurement of the $SpO_2$ area. This change can lead to differences in the $SpO_2$ reading since not every area of body tissue has the same volume of arterial blood. Another factor that governs measurement accuracy of $SpO_2$ is a light source of the device, as this can impact accuracy of the measured difference in absorption in the red and infrared (IR) wavelengths or ranges. However, pulse oximeters are typically applied externally (e.g. using a clip that attaches to a finger, earlobe, infant's foot, or so forth), and in these arrangements a gap commonly exists between the light detector sensor and patient skin. This gap can allow ambient light to fall on the light detector of the device, and contribute noise which can adversely impact accuracy of the $SpO_2$ measurement.

The following discloses new and improved systems and methods to overcome these problems.

SUMMARY

In one disclosed aspect, an oxygen saturation monitor includes a clamp having opposing first and second clamp portions. An array of light sources is disposed on the first clamp portion. Each light source is switchable between (i) off, (ii) emitting light of a first wavelength or spectral range, (iii) emitting light of a second wavelength or spectral range different from the first wavelength or spectral range; and (iv) emitting light at both the first and second wavelengths or spectral ranges. An array of light detectors is disposed on the second clamp portion facing the array of light sources. Each light detector of the array of light detectors is aligned to detect emitted light from a corresponding light source of the array of light sources.

In another disclosed aspect, an oxygen saturation monitor includes a clamp having opposing first and second clamp portions. An array of light sources is disposed on the first clamp portion. An array of light detectors is disposed on the second clamp portion. At least one motion sensor is disposed on at least one of the first clamp portion and the second clamp portion and configured to detect motion data of at least one of the first clamp portion and the second clamp portion. At least one electronic processor is programmed to: receive red light data, infrared light data, and ambient light data detected by the light detectors; receive movement data from the at least one motion sensor; correct the received light data to eliminate the detected ambient light and compensate for the motion data; and calculate an oxygen saturation signal from the corrected light data.

In another disclosed aspect, an oxygen saturation monitor includes a clamp having opposing first and second clamp portions. An array of light sources is disposed on the first clamp portion. An array of light detectors is disposed on the second clamp portion. Each light detector of the array of light detectors is configured to detect emitted light only from a corresponding light source. An accelerometer is configured to measure displacement of at least one of the first clamp portion and the second clamp portion. A gyroscope is configured to measure rotation of at least one of the first clamp portion and the second clamp portion. At least one electronic processor is programmed to: correct received red light data, infrared light data, and ambient light data detected by the light detectors to eliminate the detected ambient light to generate a corrected light signal; sum displacement data measured by the accelerometer and displacement data measured by the gyroscope; determine a light source of the array of light sources and a light detector of the array of the light detectors to measure the red light data and the infrared light data using the summed displacement data and the corrected light signal; detect red light and infrared light using the determined light source and the determined light detector; and calculate an oxygen saturation signal from the detected red light and the detected infrared light.

One advantage resides in providing measurement of blood oxygen saturation levels of a patient with improved accuracy.

Another advantage resides in reducing the impact of patient motion on blood-oxygen saturation level measurements.

Another advantage resides in reducing the impact of ambient light on blood-oxygen saturation level measurements.

Another advantage resides in compensating for motion-induced artifacts on blood-oxygen saturation level measurements.

Another advantage resides in providing a pulse oximeter that is less sensitive to patient movements and changes in ambient lighting.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

A conventional clip-on style pulse oximeter has a clamp design with red and infrared light sources in one clamp piece and a light detector in the opposing clamp piece. The device is clamped onto a fingertip, ear lobe, a foot in the case of an infant, or some other body part which is thin enough for light from the light sources to transmit through the body tissue so as to be detected at the light detector. Based on a ratio of the transmitted infrared (e.g. 950 nm) versus red (e.g. 650 nm) light, the peripheral $SpO_2$ level is measured. However, the $SpO_2$ measurement can be adversely affected by stray light picked up by the light detector.

In some embodiments disclosed herein, to improve robustness against stray light, an array of IR/R light source/photodetector pairs is employed in which each IR/R light source (itself actually a pair of light sources, one emitting red light and the other IR light) is arranged to illuminate a single one of the light detectors. The illustrative array is 3×3 though other sizes are contemplated. During an $SpO_2$ measurement, only a single IR/R light source/photodetector pair is used to measure the (uncorrected) $SpO_2$ signal. Detectors neighboring the pair used to measure the $SpO_2$ signal are used to detect any stray light. The following discloses a formula for a correction factor κ for correcting the measured $SpO_2$ signal based on the intensities measured by the neighboring detectors.

In other embodiments disclosed herein, the pulse oximeter may be provided with a displacement measurement unit comprising an accelerometer and a gyroscope mounted on the device. Both translational and rotational motion can be detected with this combination. The displacement measurement can be used in various ways, such as triggering a measurement pause when the device is in motion, triggering a new computation of the stray light correction factor κ (since with the device moved it may receive different exposure to stray light), or to update the choice of IR/R light source/photodetector pair used to measure the (uncorrected) $SpO_2$ signal.

In an alternative embodiment, machine learning (ML) could be used to train the stray light correction factor κ, the displacement corrections, or both.

Figure 1:
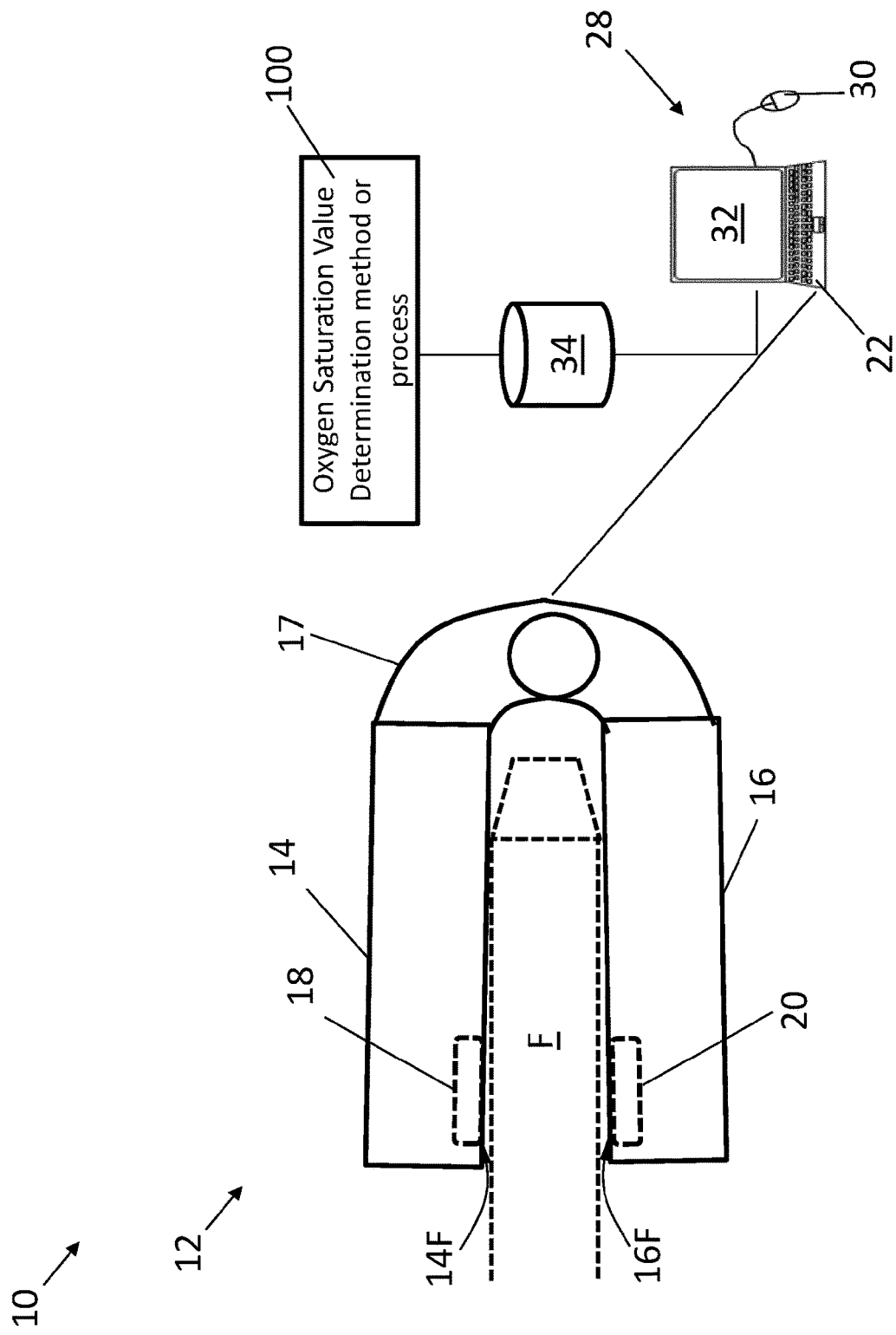
FIG. 1 diagrammatically an oxygen saturation monitor according to one aspect.

With reference to FIG. 1, an illustrative embodiment of an oxygen saturation monitor 10 is shown. In some embodiments, the oxygen saturation monitor 10 may be a pulse oximeter, in which one or more vital signs are derived from measurements obtained from the oxygen saturation monitor. The oxygen saturation monitor 10 can be configured as a clamp 12 having a first clamp portion 14 and an opposing second clamp portion 16 coupled together by a clamping mechanism 17 such as a hinge with a biasing spring. In operation, the clamping mechanism 17 biases opposing faces 14F, 16F of the respective first and second clamp pieces 14, 16 toward each other when the clamp 12 is attached to a body part. The clamping mechanism 17 is operative to bring the two opposing faces 14F, 16F into sufficiently close proximity to each other to ensure the body part (e.g. finger F) is securely held by the opposing faces 14F, 16F. It will be appreciated that the faces may optionally be contoured based on the expected geometry of the body part, and the clamping mechanism 17 is designed to provide sufficient clamping force for holding the monitor 10 to the body part without causing discomfort to the patient by excessive clamp pressure. As shown in FIG. 1, the clamp 12 is configured as a finger clamp attachable to a finger F of the patient (although the clamp may be attached to any suitable portion of a patient, such as an ankle, wrist, and so forth that is thin enough for light from light sources 18 to transmit through the body tissue of the patient (e.g., through the finger F) so as to be detected by light detectors 20). In the illustrative example, the first clamp portion 14 is disposed on a "top" portion of the finger and the second clamp portion 16 is disposed on a "bottom" portion of the finger.

It may be noted that the light sources 18 and the light detectors 20 are typically embedded in the respective faces 14F, 16F of the respective clamp portions 14, 16 and hence may be occluded from view when the monitor 10 is clamped to the finger F; this is indicated in FIG. 1 by showing the light sources 18 and the light detectors 20 using dashed lines. It will also be noted that there may be some gap or space between the light sources 18 and/or the light detectors 20 and the finger F, as shown in FIG. 1. It will be appreciated that these gaps or spaces may provide ingress paths via which stray light can reach the detectors 20. Additionally, even if no such gaps are present, the body part (e.g. finger F) onto which the monitor 10 is clamped must be optically translucent in the red and infrared in order for light from the light sources 18 to reach the light detectors 20, and so stray light can pass through the translucent body part to reach the light detectors 20.

Figure 2:
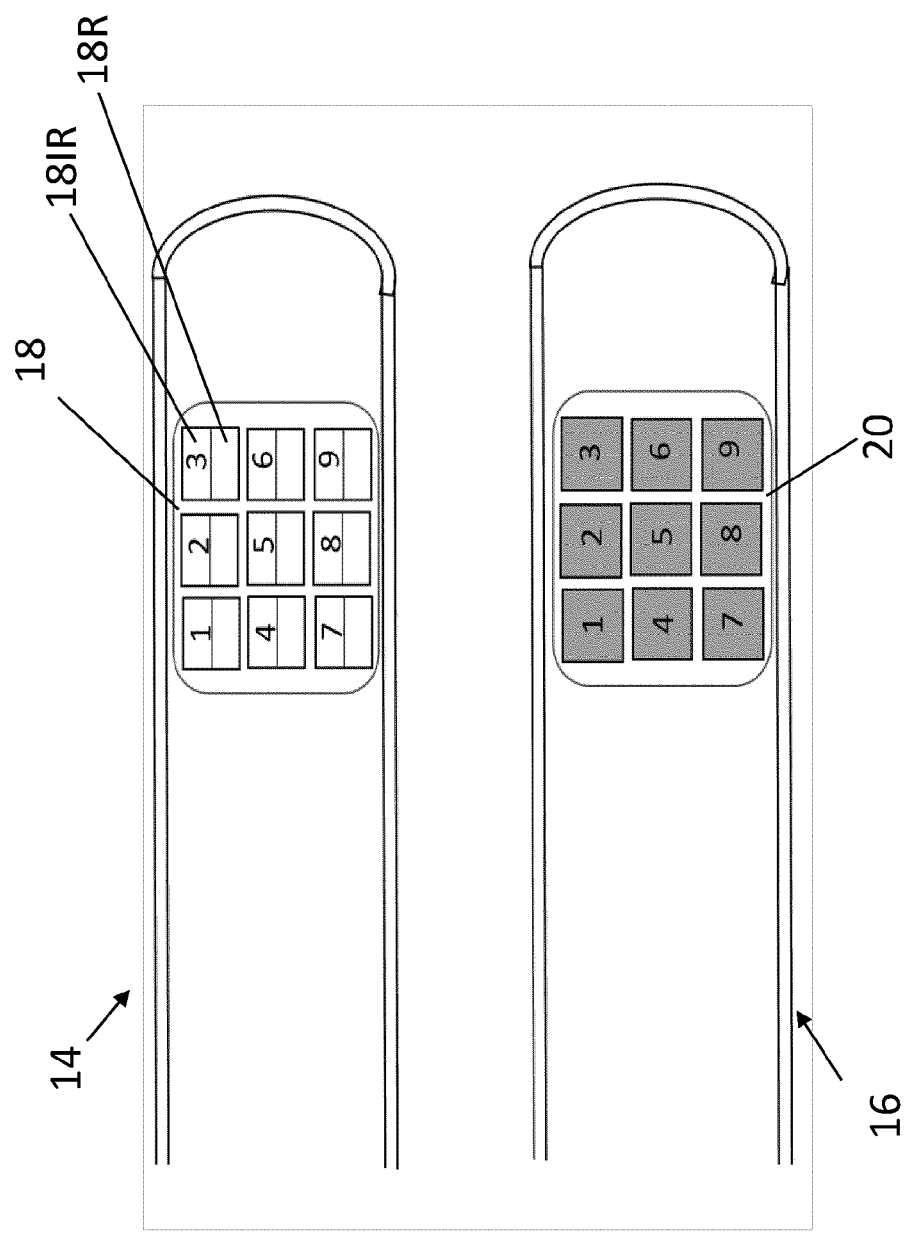
FIGS. 2 and 3 diagrammatically show different embodiments of the oxygen saturation monitor of FIG. 1.

With continuing reference to FIG. 1, and now with reference to FIG. 2, the light sources 18 comprise an array of light sources 18 that is disposed on the first clamp portion 14, and an array of light detectors 20 is disposed on the second clamp portion 16 facing the array of light sources as seen in FIG. 1. Each light detector of the array of light detectors 20 is aligned to detect emitted light from a corresponding light source of the array of light sources 18. As shown in FIG. 2, the illustrative array of light sources 18 includes 9 light sources 18.1-18.9, and the illustrative array of light detectors 20 includes 9 corresponding light detectors 20.1-20.9. The light detectors 20.1-20.9 are arranged to only detect red and/or IR light from a corresponding light source 18.1-18.9 (e.g., the light detector 20.1 only detects light emitted from the light source 18.1, the light detector 20.2 only detects light emitted from the light source 18.2, and so forth). As shown in FIG. 2, the array of light sources 18 and the array of light detectors 20 are both arranged in a 3×3 matrix, although any suitable configuration is possible. In addition, the number of light sources in the array of light sources 18 (and likewise the number of light detectors in the array of light detectors 20) can be any suitable number other than 9, so long as the number of light sources is the same as the number of light detectors).

Each of the light sources 18.1-18.9 of the array of light sources 18 is switchable between multiple modes of operation, including (i) off, (ii) emitting light of a first wavelength or spectral range, (iii) emitting light of a second wavelength or spectral range different from the first wavelength or spectral range; and (iv) emitting light at both the first and second wavelengths or spectral ranges. For example, in one embodiment the first wavelength or spectral range is red light, and the second wavelength of spectral range is infrared (IR) light. To this end, in one suitable configuration each light source 18.1-18.9 includes a red light source and an infrared light source. This is diagrammatically shown in FIG. 2, with the constituent light sources labeled as the IR light source 18IR and the red light source 18R. (This labeling is done only for the light source 18.3 for illustrative convenience, but each of the light sources 18.1-18.9 similarly includes two constituent light sources).

To control operation of the light sources 18.1-18.9 between these multiple modes of operation, the oxygen saturation monitoring further includes at least one electronic processor 22 (e.g., a microprocessor) programmed to control the array of light sources 18 to emit switched red and infrared light by a single active light source (e.g., the light source 18.3) of the array of light sources with all other light sources (e.g., the light sources 18.1-18.2 and 18.4-18.9) of the array of light sources being off. This is suitably done by: activating the infrared light source 18IR to output infrared light; activating the red light source 18R to output red light; or not activating either light source 18IR or 18R when off. The electronic processor 22 is also programmed to control operation of the array of light detectors 20. For example, the electronic processor 22 is programmed to control (or selectively read) the array of light detectors 20 to detect the switched red and infrared light using the light detector 20.1-20.9 aligned to detect emitted light from the single active light source emitted from a corresponding central light source (e.g., the central light source 18.5 is configured to emit the light, and the corresponding light detector 20.5 is controlled to be the only light detector to detect the emitted light from the central light source). Moreover, the other light detectors (e.g., the light detectors 20.1-20.4 and 20.6-20.9, or some subset of these other light detectors) are controlled by (or read by) the electronic processor 22 to detect ambient light (e.g., light not emitted from a corresponding light source 18.1-18.4 and 18.6-18.9).

The oxygen saturation monitor 10 is configured to determine an oxygen saturation value of the patient (and, optionally, one or more vital signs such as a heart rate determined from the pulsatile variation of the red and/or infrared light). In some embodiments, the electronic processor 22 is programmed to compute a red/infrared light intensity ratio for the detected switched red and infrared light, correct the red/infrared light intensity ratio based on the detected ambient light, and convert the corrected red/infrared light intensity ratio to an oxygen saturation value.

Based on a ratio of the transmitted red R (e.g. $\lambda_1$=650 nm) light versus infrared IR (e.g. $\lambda_2$=950 nm) light, a peripheral oxygen saturation (SpO$_2$) level is measured. For example, the ratio:

$$R = \frac{\log(I_{ac1})\lambda_1}{\log(I_{ac2})\lambda_2}$$

can be computed, where $I_{ac1}$, $I_{ac2}$ are the ac components of the intensity for the red light (i.e., index ac1) and the IR light (i.e., index ac2) respectively. The signal R is converted to an SpO$_2$ reading in units of a percentage (where SpO$_2$=100% is fully oxygenated blood) using a suitable calibration look-up table or calibration function determined for healthy patients having a full oxygen saturation level (e.g., SpO$_2$=100%). A pulse (i.e. heart rate) can also be detected as the periodicity of intensity oscillations of the detected light.

However, the SpO$_2$ measurement (or equivalently, the value of the ratio R in the above example) can be adversely affected by stray light picked up by one or more of the light detectors (e.g., the non-central light detectors 20.1-20.4 and 20.6-20.9). To improve robustness against stray light, the array of light sources 18 and the array of light detectors 20 are arranged as pairs. As shown in FIG. 2 and as labeled for exemplary light source 18.3, the light sources 18.1-18.9 are each arranged as a pair of switched light sources, one light source 18R emitting red light and the other light source 18IR emitting IR light. The light sources 18.1-18.9 illuminate the corresponding light detector 20.1-20.9. During an SpO$_2$ measurement, only a single IR/R light source/photodetector pair (e.g., the light source 18.5 and the light detector 20.5) is used to measure the signal ratio R. However, the detectors of neighboring pairs (e.g., light detectors 20.1-20.4 and 20.6-20.9) operate to detect any stray light. The signal R measured by the chosen pair can be corrected based on intensity values measured by the neighboring detectors (here indexed j) using the correction $R_{corrected}$=R−κ where the correction κ is given by Equation (1):

$$\kappa = \sum_j \alpha_j \beta_j I_j \qquad (1)$$

$$\text{where } I_j = \frac{\log(I_{st1})\lambda_1}{\log(I_{st2})\lambda_2}$$

In the correction κ, the index j runs over a set of detectors neighboring the pair (e.g., the light source 18.5 and the light detector 20.5) used to measure signal R, the factor $\alpha_j$ is a contribution factor for detector j (e.g., detectors closer to the edge of the array. (For example detectors 20.3, 20.6, 20.9, as shown in FIG. 2, receive more higher stray light compared to detectors 20.1, 20.4, 20.7) are expected to detect higher stray light intensity and hence have higher α values), the factor $\beta_j$ is proportional to the Euclidean distance of the detector j to the pair used to measure signal R. The intensities $I_{st1}$ and $I_{st2}$ are measured without any of the light sources 18.1-18.9 operating for a given source detector 20.1-20.9 combination. The intensity $I_{st1}$ corresponds to AC components of the intensity for the red light component of stray light observed by detector j, and similarly intensity $I_{st2}$ corresponds to ac component of IR intensity component of stray light observed by detector j In other embodiments, the electronic processor 22 is programmed to correct the red/infrared light intensity ratio based on the detected ambient light using a machine-learned (ML) model. The ML model is trained on historical oxygen saturation measurement values. For example, data can be collected for a healthy test subject having SpO$_2$=100%, with a ground truth measurement acquired in complete darkness (e.g., placed in a dark room with no stray light present). Various intensity levels and spatial orientations of stray light can then be applied during SpO$_2$ measurements together with measurements by the other detectors with all light sources of the set of light sources 18 turned off. The ML model (which may, for example, be a support vector machine (SVM), a neural network, or so forth) is trained to receive these as inputs and to output κ values that correct the measurements to output the a priori known ground truth $SpO_2=100\%$.

Figure 3:
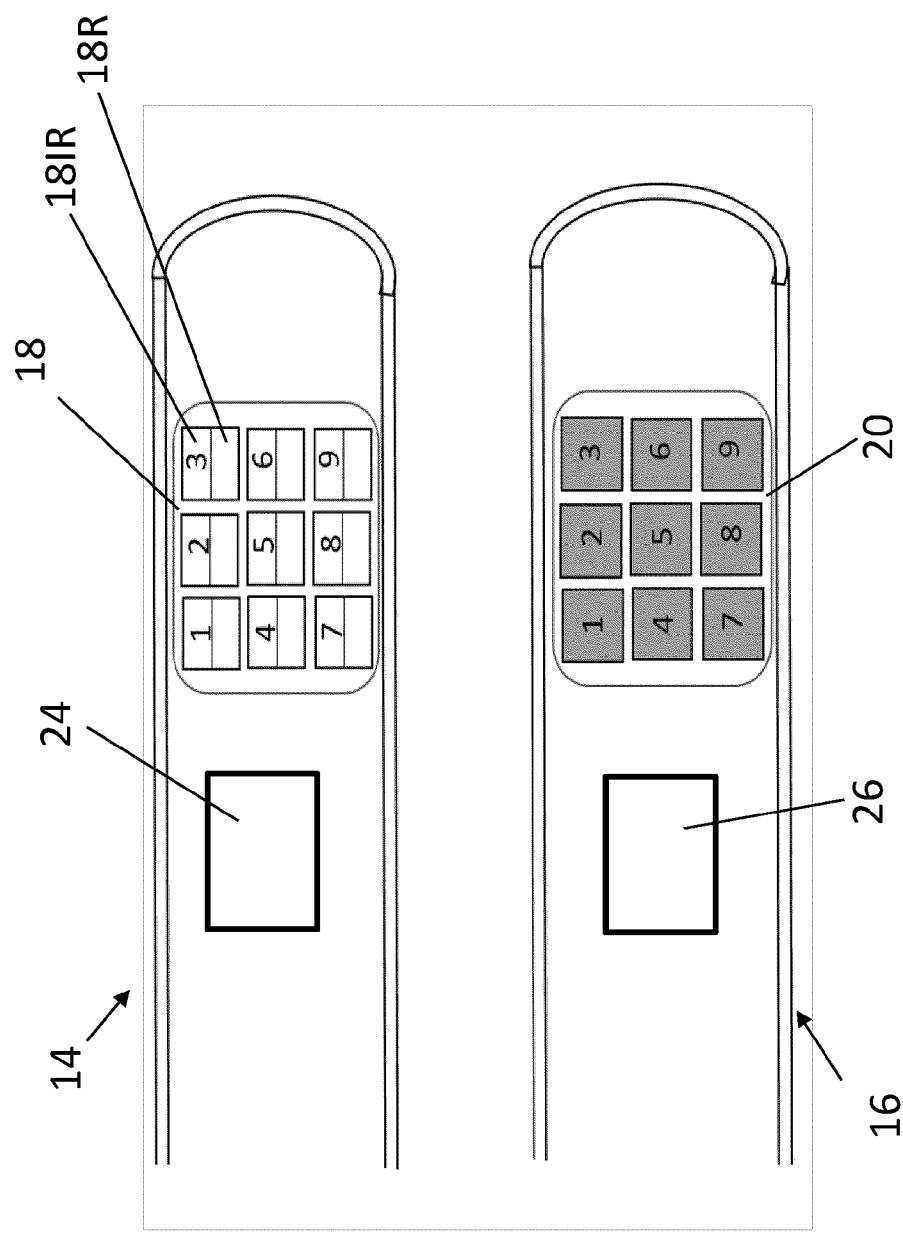

With reference now to FIG. 3, and with continuing reference to FIG. 1, the oxygen saturation monitor 10 optionally further includes at least one motion sensor configured to measure movement of at least one of the first clamp portion 14 and the second clamp portion 16. The electronic processor 22 is, in these embodiments, programmed to determine the oxygen saturation value based on the detected red light and infrared light, along with the detected movement.

The at least one motion sensor includes (i) an accelerometer 24 configured to measure displacement of at least one of the first clamp portion 14 and the second clamp portion 16; and (ii) a gyroscope 26 configured to measure rotation of at least one of the first clamp portion and the second clamp portion. As shown in FIG. 3, the accelerometer 24 is disposed on (and configured to measure displacement of) the first clamp portion 14, and the gyroscope 26 is disposed on (and configured to measure rotation of) the second clamp portion 16, although the opposite arrangement may be implemented. It should be noted that since the first and second clamp portions 14, 16 are mechanically connected by the clamping mechanism 17, it is expected that the first and second clamp portions 14, 16 (together with the clamping mechanism 17) will be displaced or rotated as a single rigid unit.

The accelerometer 24 is configured to measure movement (for example, lateral movement) data in three dimensions (e.g., along x-, y-, and z-axes) of the first clamp portion 14. A first displacement value is determined by the electronic processor 22 from the movement measured data by the accelerometer 24. The first displacement value is determined by Equation 2:

$$\text{Displacement}_{(Accelerometer)} = V_{(Original\ Position)} - V_{(New\ Position)} \quad (2)$$

where V is a sum of positions of the accelerometer 24 in x-, y-, and z-directions.

The gyroscope 26 is configured to measure movement (for example, rotational movement) data in three axes (e.g., along pitch-, roll-, and yaw-axes) of the second clamp portion 16. A second displacement value is determined by the electronic processor 22 from the movement data measured by the gyroscope 26. The second displacement value is determined by Equation 3:

$$\text{Displacement}_{(Gyroscope)} = \frac{\partial D_{roll}}{\partial t} \text{ where } \frac{\partial D_{roll}}{\partial t}$$

is rotational data along the roll axis of the gyroscope 26. It will be appreciated that only movement along the roll axis of the gyroscope 26 (e.g., rotation of the finger F in a clockwise/clockwise direction) is collected, as the finger would not rotate along a pitch axis or a yaw axis of the gyroscope, which are transverse to the roll axis. In determining the oxygen saturation value, the electronic processor 22 is programmed to determine a final displacement value by summing the first displacement value (e.g., from the data collected by the accelerometer 24 according to Equation 2) and the second displacement value (e.g., from the data collected by the gyroscope 26 according to Equation 3).

In other embodiments, the electronic processor 22 is programmed to determine the displacement values using a machine-learned (ML) model. The ML model is trained on historical oxygen saturation measurement values with displacement values compensated for. For example, data can be collected for a healthy test subject having $SpO_2=100\%$, with a ground truth measurement acquired with the monitor completely immobile. Various displacement and/or rotation motions can then be applied during $SpO_2$ measurements together with measurements by the accelerometer and gyroscope. The ML model, which may for example be a SVM, a neural network, or so forth, is trained to receive these as inputs and to output motion corrections that correct the measurements to output the a priori known ground truth $SpO_2=100\%$.

It will also be appreciated that the motion sensors 24, 26 can be used in conjunction with the ambient light correction in various ways. For example, to reduce computational load, the ambient light correction factors κ can be computed only intermittently. This is based on the expectation that the ambient light is not expected to change except when accompanied by motion of the oxygen saturation monitor 10. For example, the ambient light as seen by the monitor 10 may change any time the monitor 10 is moved or rotated, since in such a case the position and/or orientation of the monitor 10 relative to the bedside lamp or other ambient light source(s) may change. On the other hand, as long as the monitor 10 is stationary, the ambient light that is "seen" by the monitor 10 is unlikely to change rapidly. Even in the case of the bedside lamp being turned off, e.g. at lights-out, this will often be accompanied by some motion of the patient. Hence, in some contemplated embodiments, the ambient light correction κ is re-measured and re-computed relatively infrequently, e.g. at three minute intervals, but a detected movement of the monitor 10 will trigger an immediate re-measurement and re-computation of κ.

Referring back to FIG. 1, the oxygen saturation monitor 10 also includes (or is controlled by) a computing device 28 (e.g., typically a workstation computer, or more generally a computer, although another form factor such as a tablet, a smartphone, and so forth is also contemplated). The workstation 28 comprises a computer or other electronic data processing device with typical components, such as the at least one electronic processor 22 (which can be alternatively be embedded in the clamp 12), at least one user input device (e.g., a mouse, a keyboard, a trackball, and/or the like) 30, and a display device 32. In some embodiments, the display device 32 can be a separate component from the computer 28.

One or more non-transitory storage media 34 are also provided to store data and instructions (e.g. software) that are readable and executable by the computing device 28 to perform oxygen saturation value measurement processes as disclosed herein, and/or executable by the workstation or other controller 18 to control the oxygen saturation monitor 10 to measure the oxygen saturation values (e.g., by determining and using the final displacement value and the corrected red/infrared light intensity ratio as described above). The non-transitory storage media 34 may, by way of non-limiting illustrative example, include one or more of a magnetic disk, RAID, or other magnetic storage medium; a solid-state drive, flash drive, electronically erasable read-only memory (EEROM) or other electronic memory; an optical disk or other optical storage; various combinations thereof; or so forth. The storage media 34 may comprise a plurality of different media, optionally of different types, and may be variously distributed. The storage media 34 can store instructions executable by the electronic processor 22 to perform an oxygen saturation value determination method or process 100. From the final displacement value and the corrected red/infrared light intensity ratio, the electronic processor 22 is programmed to determine the oxygen saturation value using oxygen saturation value determination method.

Figure 4:
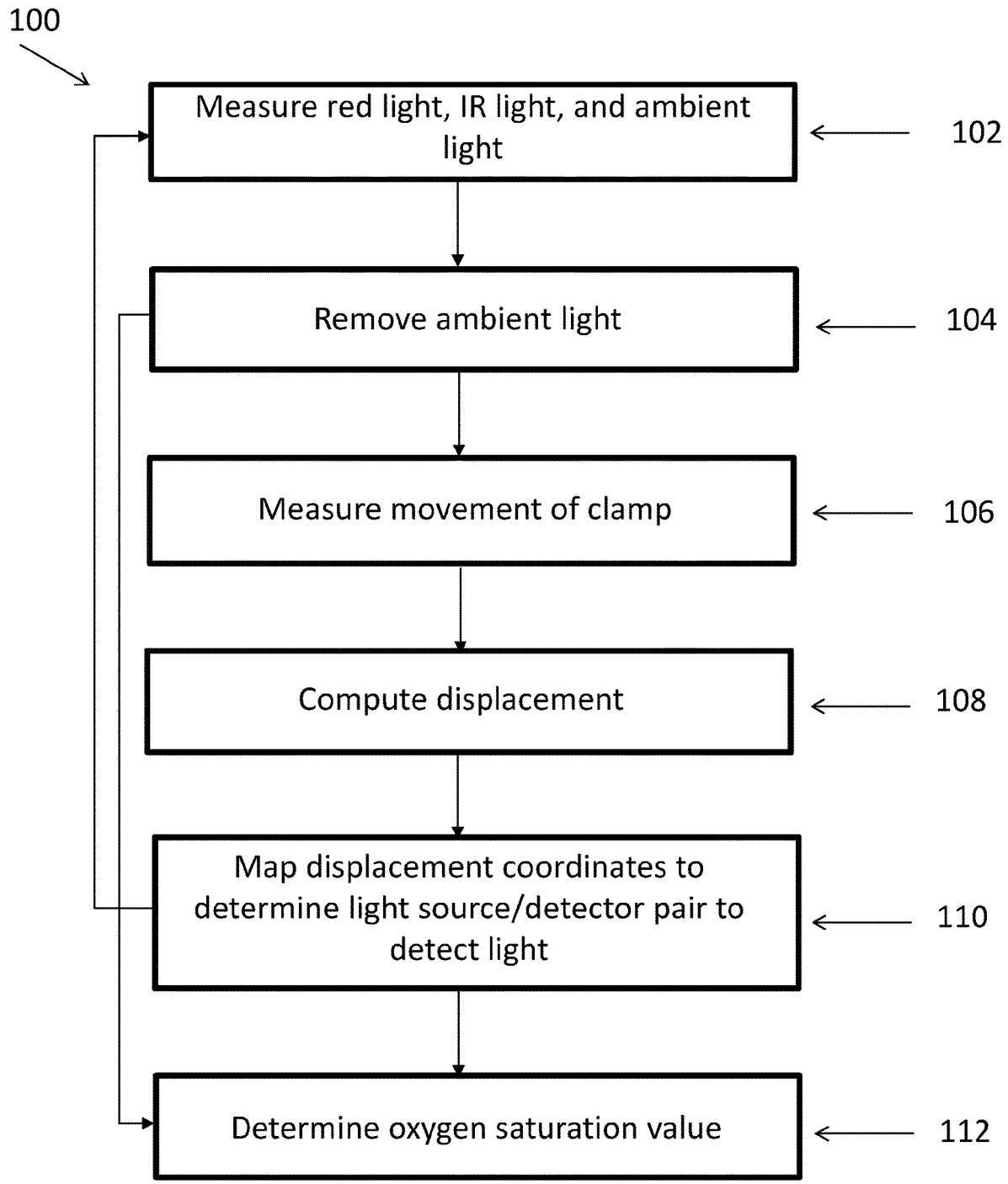
FIG. 4 shows exemplary flow chart operations of the oxygen saturation monitor of FIG. 1.

With reference to FIG. 4, an illustrative embodiment of the oxygen saturation method 100 is diagrammatically shown as a flowchart. At 102, when the clamp 12 is affixed to the patient, the electronic processor 22 is programmed to control the central light source/detector pair (e.g., the light source 18.5 and the light detector 20.5) to measure red and IR light, while the remaining light source/detector pairs are controlled to measure ambient light.

At 104, the electronic processor 22 is programmed to correct the measured red and IR light data by subtracting the ambient light contribution from the measured light to generate corrected oxygen saturation values. This correction can be performed by the electronic processor 22 using Equation 1. In some examples, the corrected oxygen saturation values can be displayed on the display device 32 of the computing device 28.

At 106, the electronic processor 22 is programmed to control the accelerometer 24 and the gyroscope 26 to measure the respective lateral movement and rotational movement data. It will be appreciated that operation 106 can be performed before, after, or simultaneously with operation 102 (i.e., the detection of light).

At 108, the electronic processor 22 is programmed to compute the final displacement value from the motion data measured by the accelerometer 24 and the gyroscope 26. With the final displacement value, the electronic processor is programmed to compute a displacement of the clamp 12 on the patient. For example, the original location of the clamp 12 (at operation 102) can be calibrated to have Cartesian coordinates of (0, 0, 0). The displacement coordinates can be computed as ($\delta$t1, $\delta$t2, $\delta$t3).

At 110, the electronic processor 22 is programmed to map the displacement coordinates ($\delta$t1, $\delta$t2, $\delta$t3) to a best possible light source/light detector pair that corresponds to the same anatomical area (e.g., where the clamp 12 is attached) as originally measured. The "best" light source/light detector pair is the pair that detects the least amount of ambient light (and therefore detects the most amount of red and/or IR light) determined using Equation 1. To do so, the electronic processor 22 is programmed to determine new $\alpha$ and $\beta$ values of the detectors 20.1-20.9 from Equation 1 to measure ambient light from the mapped displacement coordinates ($\delta$t1, $\delta$t2, $\delta$t3). For example, movement of the clamp 12 relative to the patient area which the clamp is attached may cause a different weight (e.g., $\alpha$ and/or $\beta$) for one of the light detectors 20.1-20.9. In one example, the light source/detector pair 18.5/20.5 is used to record SpO$_2$ values. A clock-wise rotational motion of the finger F causes a similar movement of the clamp 12, which is detected by the gyroscope 26. This detected movement can trigger the electronic processor 22 to determine that new source/detector pair (e.g., light source/detector pair 18.8/20.8) should be that maps to corresponding same anatomical area of the finger F that is used to measure SpO2 values before motion (e.g., the portion of the finger covered by the source/detector pair 18.5/20.5). This detected movement of the finger F causes a change in the layout of the array of light sources 18 and the array of light detectors 20, which requires for the electronic processor 22 to calculate new $\alpha$ and $\beta$ values for all detectors. With the new calculations, for example, detector 20.9 will have new $\alpha$ and $\beta$ values that is similar to what detector 20.6 had before the detected rotational motion as detector 20.9 is closer to new source/detector pair 20.8, on a similar line, all other detector weightage can be computed for each light source/detector pair 18.1-18.9/20.1-20.9.

In another example, the light source/detector pair 18.5/20.5 is again used to record SpO$_2$ values. The $\alpha$ value of the detector 20.6 is high and its $\beta$ value is low due to its proximity to detector 20.5. If the patient adjusts the clamp 12 towards the wrist (e.g., by sliding the clamp along the finger F), this translational movement is detected by the accelerometer 24. The source/detector pair 18.4/20.4 begins to cover the same anatomical area of the finger F previously covered by the source/detector pair 18.5/20.5. The electronic processor 22 determines the new $\alpha$ and $\beta$ values for all detectors 20 to determine that the source/detector pair 18.4/20.4 should be used to measure SpO$_2$ values.

At 112, the electronic processor 22 is programmed to use the new set of light sensors of the array of light sources 18 to mark this new set as a new light source/detector pair 18.5/20.5 to detect red and IR light signals to determine the oxygen saturation value in the patient.

The disclosure has been described with reference to the preferred embodiments. Modifications and alterations may occur to others upon reading and understanding the preceding detailed description. It is intended that the disclosure be construed as including all such modifications and alterations insofar as they come within the scope of the appended claims or the equivalents thereof.

The invention claimed is:

1. An oxygen saturation monitor, comprising:
    a clamp having opposing first and second clamp portions;
    an array of light sources disposed on the first clamp portion, each light source being switchable between (i) off, (ii) emitting light of a first wavelength or spectral range, wherein the first wavelength or spectral range is red light, (iii) emitting light of a second wavelength or spectral range different from the first wavelength or spectral range, wherein the second wavelength or spectral range is infrared light; and (iv) emitting, at the same time, light at both the first and second wavelengths or spectral ranges;
    an array of light detectors disposed on the second clamp portion facing the array of light sources; and
    an electronic processor programmed to:
        control the array of light sources to emit switched red and infrared light by a single active light source of the array of light sources with all other light sources of the array of light sources being off, detect the switched red and infrared light using a light detector of the array of light detectors that is aligned to detect emitted light from the single active light source emitted from a corresponding central light source;
        detect ambient light using light detectors of the array of light detectors other than the light detector that is aligned to detect emitted light from the single active light source;
        compute a red/infrared light intensity ratio for the detected switched red and infrared light;
        calculate a correction factor (x) from the ambient light detected by the light detectors of the array of light detectors other than the light detector that is aligned to detect emitted light from the single active light source scaled based on Euclidean distances ($\beta$) of the respective detectors from the light detector that is aligned to detect emitted light from the single active light source;

correct the red/infrared light intensity ratio by subtracting the correction factor to from the red/infrared light intensity ratio; and convert the corrected red/infrared light intensity ratio to an oxygen saturation value;

wherein each light detector of the array of light detectors is aligned to detect emitted light from a corresponding light source of the array of light sources.

2. The oxygen saturation monitor of claim 1, wherein the correction factor is $$\kappa = \sum_j \alpha_j \beta_j I_j$$

where $I_j = \dfrac{\log(I_{st1})\lambda_1}{\log(I_{st2})\lambda_2}$ wherein $\kappa$ the correction factor, $\propto$ is a contribution factor for detector j, $\beta$ is Euclidean distance between the detector j and a detector that received red light and infrared light from a corresponding light source, and $\lambda_1$ is the wavelength of the received red light, and $\lambda_2$ is the wavelength of the received infrared light, and $I_{st1}$ and $I_{st2}$ are light intensities measured without any of the light sources operating for a given corresponding detector.

3. The oxygen saturation monitor of claim 1, wherein the electronic processor is further programmed to:

correct the red/infrared light intensity ratio based on the detected ambient light using a machine-learned model.

4. The oxygen saturation monitor of claim 1, wherein the array of light sources and the array of light detectors are both arranged in a 3×3 matrix.

5. The oxygen saturation monitor of claim 1, further including:

at least one motion sensor configured to measure movement of at least one of the first clamp portion and the second clamp portion; and wherein the electronic processor is further programmed to determine the oxygen saturation value based at least on light of the first wavelength or spectral range and the second wavelength or spectral range output by the array of light sources and measured by the array of light detectors and further based on the measured movement.

\* \* \* \* \*